J. F. LEITH.
RUNNER ATTACHMENT FOR VEHICLES.
APPLICATION FILED APR. 5, 1911.

1,024,792.

Patented Apr. 30, 1912.

Inventor
John Fred Leith

Witnesses

By Joshua R. H. Potts
Attorney

UNITED STATES PATENT OFFICE.

JOHN FRED. LEITH, OF CLEVELAND, OHIO.

RUNNER ATTACHMENT FOR VEHICLES.

1,024,792.  Specification of Letters Patent.  Patented Apr. 30, 1912.

Application filed April 5, 1911. Serial No. 619,076.

*To all whom it may concern:*

Be it known that I, JOHN F. LEITH, a citizen of the United States, residing at Cleveland, county of Cuyahoga, and State of Ohio, have invented certain new and useful Improvements in Runner Attachments for Vehicles, of which the following is a specification.

My invention relates to runner attachments for vehicles and the object of my invention is to provide a device of the class mentioned particularly adapted for use upon baby carriages, go-carts and the like, whereby the wheeled vehicle may be readily transformed into a sleigh.

Further objects of my invention are to provide an attachment of the character mentioned which shall be of simple construction, easy to apply or detach from the vehicle and which shall be of low cost to manufacture.

Other objects will appear hereinafter.

With these objects in view my invention consists generally in a runner formed of a channel member having its forward end curved to conform to the front wheel of the vehicle, spring clamps for attaching the forward end to the wheel and means for securing the runner adjacent its rear end to the hub of the rear wheel.

My invention further consists in a runner as mentioned equipped with means for adjustably attaching the rear securing means to the runner whereby the device may be adjusted to vehicles of various sizes.

My invention further consists in various details of construction and arrangements of parts all as will be fully described hereinafter and particularly pointed out in the claim.

My invention will be more readily understood by reference to the accompanying drawings forming a part of this specification and in which—

Figure 1:
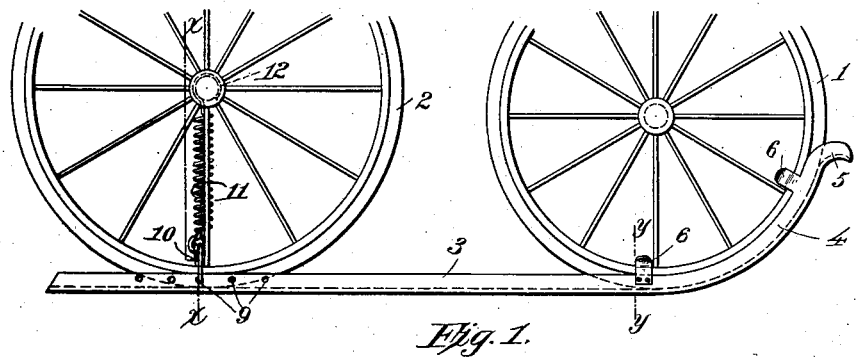
Figure 2:
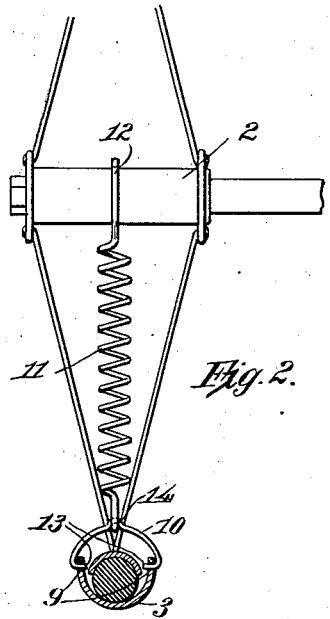
Figure 3:
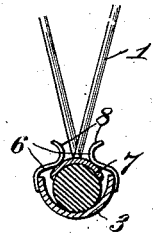
Figure 4:
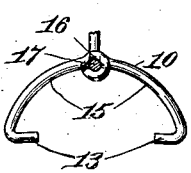
Figure 5:

Figure 1 is a side elevation of one of the runners embodying my invention in its preferred form and illustrating the same in position upon the vehicle wheels, Fig. 2 is a vertical transverse section on substantially the line $x$—$x$ of Fig. 1, Fig. 3 is a similar view taken on the line $y$—$y$ of Fig. 1, Fig. 4 is a detail view upon an enlarged scale illustrating the fastening between the rear attaching means and the runner, and Fig. 5 is a side view of the same.

Referring now to the drawings 1 and 2 indicate the front and rear wheels of a vehicle respectively and 3 the runner. The runner consists of a channel member, substantially U-shaped in cross-section and having its forward end bent upwardly in an arc as at 4 to conform to the front wheel 1, the extreme end of the runner being curved forwardly as at 5 which prevents the end of the runner cutting or injuring the tire.

Two pairs of spring clamps are preferably employed for attaching the forward end of the runner to the front wheel. 6 indicates the clamps, one pair of which is arranged at or near the upper end of the portion 4 and the other pair at the point where the portion 4 merges into the straight portion 3. These clamps may be formed integrally with the runner as indicated at the upper clamp in Fig. 1 or may be made separately and secured thereto as by riveting as illustrated in Fig. 3 and in the lower clamp of Fig. 1. The latter form is preferable as the runner may then be manufactured at a much lower cost. The clamps comprise a pair of spring arms curved inwardly to impinge against the inner face of the rim 7 of the wheel and then flared outwardly as at 8 to facilitate inserting the rim and tire of the wheel.

The side walls of the runner, adjacent the rear end are provided with a plurality of apertures 9, and these apertures are arranged opposite each other in pairs. Engaging a pair of the apertures 9 is a fastening device 10 to which is secured a helical spring 11. The opposite end of the spring 11 from that to which the member 10 is attached is provided with a hook 12 adapted to engage the hub of the wheel between the spokes as shown in Fig. 2. The tension of the springs 11 is sufficient to maintain the runner 3 in position against the rear wheel. The distance between the front and rear wheels of vehicles of the class under consideration varies, and it is for this reason that a number of pairs of the apertures 9 are provided in order that the fastening device 10 may engage the runner 3 in proper relation to the rear wheel. The member 10 may be of any preferred form. In Fig. 2 I have illustrated the same as a spring bow shaped member having its ends 13 turned inwardly to engage the apertures 9 and provided at the center with an off-set portion 14 which is engaged by the end of the spring 11. In Figs. 4 and 5 I have illustrated the member 10 as formed of two independent members 15 having eyes 16 engaging an eye 17 on the end of the spring 11 and having their free ends turned inwardly as at 13 to engage the apertures 9.

In applying the device the front wheel is forced between the clamp 6 with the rim and tire resting in the portion 4 of the runner and with the rear wheel 2 also resting in the runner as shown in Fig. 1. The member 10 is then placed in position spanning the rim of the rear wheel and with the ends 13 engaging one pair of the apertures 9, after which the hook 12 is slipped over the hub of the rear wheel. To detach the device the hook 12 is first disengaged from the hub and the member 10 removed after which the runner may be easily withdrawn from the front wheel.

The device is of simple construction and may be manufactured at a low cost and may be readily attached or detached from the vehicle.

Having described my invention what I claim as new and desire to secure by Letters Patent is:

In a device of the class described, a runner formed of a bar U-shaped in cross-section and curved at one end to fit the front wheel of a vehicle and provided adjacent its other end with a pair of apertures in its opposite side walls, a fastening member detachably engaging said apertures, a spring attached to said member and a hook on the opposite end of said spring adapted to engage the hub of the rear wheel, substantially as described.

In testimony whereof I have signed my name to this specification in the presence of two subscribing witnesses.

JOHN FRED. LEITH.

Witnesses:
 CHAS. F. BATIG,
 J. G. HAGENMEYER.

---

Copies of this patent may be obtained for five cents each, by addressing the "Commissioner of Patents, Washington, D. C."